(12) United States Patent
Asoma (10) Patent No.: US 7,948,538 B2
(45) Date of Patent: May 24, 2011

(54) IMAGE CAPTURING APPARATUS, IMAGE CAPTURING METHOD, EXPOSURE CONTROL METHOD, AND PROGRAM

(75) Inventor: Akira Asoma, Kanagawa (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 12/055,741

(22) Filed: Mar. 26, 2008

(65) Prior Publication Data

US 2008/0266424 A1  Oct. 30, 2008

(30) Foreign Application Priority Data

Apr. 24, 2007  (JP) ................................. 2007-113965

(51) Int. Cl.
  *H04N 5/235* (2006.01)
  *H04N 3/14* (2006.01)
  *H04N 5/335* (2006.01)
  *G03B 7/00* (2006.01)

(52) U.S. Cl. ...................... 348/297; 348/229.1; 348/362

(58) Field of Classification Search ............... 348/218.1, 348/222.1, 229.1, 230.1, 251, 296–297, 362
  See application file for complete search history.

(56) References Cited

U.S. PATENT DOCUMENTS

| | | | |
|---|---|---|---|
| 5,194,960 A * | 3/1993 | Ota ................................ | 348/362 |
| 5,455,621 A | 10/1995 | Morimura | |
| 6,670,993 B1 | 12/2003 | Yamamoto et al. | |
| 6,803,946 B1 * | 10/2004 | Wakiyama et al. ........ | 348/211.6 |
| 7,098,946 B1 * | 8/2006 | Koseki et al. ............... | 348/229.1 |
| 2002/0145674 A1 | 10/2002 | Nakamura et al. | |
| 2003/0098914 A1 | 5/2003 | Easwar | |
| 2004/0095472 A1 * | 5/2004 | Yoshida et al. ........... | 348/208.12 |
| 2006/0033823 A1 | 2/2006 | Okamura | |
| 2006/0250515 A1 * | 11/2006 | Koseki et al. ................. | 348/362 |
| 2008/0284872 A1 * | 11/2008 | Asoma ........................ | 348/229.1 |
| 2009/0086056 A1 | 4/2009 | Asoma | |
| 2009/0086061 A1 | 4/2009 | Asoma | |
| 2009/0086085 A1 | 4/2009 | Asoma | |
| 2010/0066858 A1 | 3/2010 | Asoma | |

FOREIGN PATENT DOCUMENTS

| | | |
|---|---|---|
| CN | 1140109 C | 2/2004 |
| EP | 0 930 780 A1 | 7/1999 |
| EP | 0 987 885 A2 | 3/2000 |
| JP | 6-141229 | 5/1994 |
| JP | 11-205661 | 7/1999 |
| JP | 2000-92378 | 3/2000 |
| JP | 2002-84449 | 3/2002 |
| JP | 2004-120205 | 4/2004 |

* cited by examiner

*Primary Examiner* — Sinh Tran
*Assistant Examiner* — Daniel M Pasiewicz
(74) *Attorney, Agent, or Firm* — Oblon, Spivak, McClelland, Maier & Neustadt, L.L.P.

(57) ABSTRACT

An image capturing apparatus includes: an image capturing unit configured to generate a long-exposure image signal and a short-exposure image signal on the basis of light transmitted from a subject and output the long-exposure image signal and the short-exposure image signal as image capturing signals; a signal processing unit configured to generate a combined image signal by combining the long-exposure image signal and the short-exposure image signal, the combined image signal having a dynamic range that is relatively wider than that of at least any one of the long-exposure image signal and the short-exposure image signal; a detection unit configured to generate luminance information of the combined image signal; and a control unit configured to perform automatic exposure control for the short-exposure image signal using the luminance information in an exposure setting mode in which exposure control is performed in accordance with a user's setting.

8 Claims, 9 Drawing Sheets

IMAGE CAPTURING APPARATUS, IMAGE CAPTURING METHOD, EXPOSURE CONTROL METHOD, AND PROGRAM

CROSS REFERENCES TO RELATED APPLICATIONS

The present invention contains subject matter related to Japanese Patent Application JP 2007-113965 filed in the Japanese Patent Office on Apr. 24, 2007, the entire contents of which are incorporated herein by reference.

BACKGROUND OF THE INVENTION

1. Field of the Invention

The present invention relates to image capturing apparatuses, image capturing methods, exposure control methods, and programs, and, more particularly, to an exposure control method for an image capturing apparatus that generates a combined image signal with a wide dynamic range by combining a long-exposure image signal and a short-exposure image signal.

2. Description of the Related Art

In image capturing apparatuses in the related art which use a solid-state pickup device such as a CCD (Charge Coupled Device), the quantity of light to be input into the pickup device (quantity of light exposure) is controlled by controlling an aperture value and an electronic shutter speed. That is, when a bright scene is captured, the quantity of light exposure is reduced so as to prevent the occurrence of overexposure that is caused by saturation of a signal output from an image pickup device. Conversely, when a dark scene is captured, the quantity of light exposure is increased so as to prevent the occurrence of underexposure.

However, when a scene with a strong contrast is desired to be captured (image capturing of a backlit subject or simultaneous image capturing of an indoor scene and an outdoor scene) using a solid-state image pickup device with an insufficient dynamic range, even if quantity of light exposure is controlled, overexposure may occur in a bright portion of the scene due to the saturation of the bright portion and underexposure may occur in a dark portion of the scene. As a result, both of these portions cannot be appropriately reproduced.

As a method of overcoming such a difficulty, U.S. Pat. No. 5,455,621 (corresponding to Japanese Unexamined Patent Application Publication No. 6-141229) discloses a method of separately obtaining bright area information and dark area information by using two different electronic shutter speeds in a field or changing an electronic shutter speed for each field, and combining the obtained pieces of information into a single image. This method is employed by apparatuses capable of capturing an image with a wide dynamic range (wide dynamic range cameras). In addition, U.S. Patent Publication No. 2006/033823 A1 (corresponding to Japanese Unexamined Patent Application Publication No. 2004-120205) and Japanese Unexamined Patent Application Publication No. 2002-84449 disclose apparatuses and methods for improving the quality of the above-described combined image.

In general, there are two exposure control modes, an exposure mode in which exposure control is performed in accordance with a user's setting and an automatic exposure (autoexposure) mode in which exposure control is automatically is performed. In the following description, the exposure mode in which exposure control is performed in accordance with a user's setting will be referred to as an "exposure setting mode" so as to be distinguished from the "automatic exposure mode." In the exposure setting mode, a user optionally sets an exposure period for an image pickup device unit, an aperture value, and a value of a gain to be applied to a signal output from the image pickup device unit in accordance with the condition of a subject, the image of which is desired to be captured. In the automatic exposure mode, a control unit (microcomputer) included in an apparatus automatically sets the exposure period, the aperture value, and the gain value in accordance with a detection result of a luminance level of an image capturing area so that an appropriate luminance level can be obtained.

Here, if the exposure setting mode is selected in a camera that does not have a wide dynamic range image capturing function, a user controls the exposure period, the aperture value, and the gain value in accordance with the luminance level of a subject the image of which is desired to be captured (a main subject) so that an appropriate exposure level can be obtained. As a result, even if a luminance level of the background of the main subject is changed, the luminance level of the main subject can be maintained. On the other hand, however, overexposure may occur at a portion with a high luminance level on the background due to the saturation of the portion since exposure control is not performed in accordance with the luminance level of the background.

The above-described patent documents disclose a technique for improving image quality of a wide dynamic range camera by improving the method of combining images captured with two significantly different quantities of light exposure, but do not disclose a technique for improving the image quality of a combined image by performing image capturing with a wide dynamic range (combined image capturing) in the exposure setting mode.

SUMMARY OF THE INVENTION

It is desirable to overcome the above-described difficulty in the exposure setting mode using a wide dynamic range image capturing function and improve image quality of an image captured in the exposure setting mode.

An image capturing apparatus according to an embodiment of the present invention includes: an image capturing unit configured to generate a long-exposure image signal and a short-exposure image signal on the basis of light transmitted from a subject and output the long-exposure image signal and the short-exposure image signal as image capturing signals, the long-exposure image signal being generated by exposure for a relatively long period and the short-exposure image signal being generated by exposure for a relatively short period; a signal processing unit configured to generate a combined image signal by combining the long-exposure image signal and the short-exposure image signal, the combined image signal having a dynamic range that is relatively wider than that of at least any one of the long-exposure image signal and the short-exposure image signal; a detection unit configured to generate luminance information of the combined image signal; and a control unit configured to perform automatic exposure control for the short-exposure image signal using the luminance information in an exposure setting mode in which exposure control is performed in accordance with a user's setting.

The detection unit generates a luminance histogram as the luminance information. The control unit detects occurrence of overexposure in the combined image signal using the luminance histogram, sets a short-exposure period on the basis of a detection result, and performs the automatic exposure control for the short-exposure image signal using the short-exposure period.

The control unit sets a new short-exposure period by performing computation using a current short-exposure period and a fixed value.

Alternatively, the control unit calculates a percentage of a desired luminance level region to a whole luminance level region in the combined image signal, and sets the new short-exposure period on the basis of a relationship between the percentage and a convergence target value.

The detection unit classifies luminance levels into a black level, an intermediate luminance level, and a white level and generates information about a distribution of these luminance levels as the luminance histogram. The control unit uses information about the intermediate luminance level for setting of the short-exposure period.

An image capturing method according to an embodiment of the present invention includes the steps of: generating a long-exposure image signal by exposure for a relatively long period and a short-exposure image signal by exposure for a relatively short period on the basis of light transmitted from a subject in an exposure setting mode in which exposure control is performed in accordance with a user's setting so as to output the long-exposure image signal and the short-exposure image signal as image capturing signals; generating a combined image signal by combining the long-exposure image signal and the short-exposure image signal, the combined image signal having a dynamic range that is relatively wider than that of at least any one of the long-exposure image signal and the short-exposure image signal; generating luminance information of the combined image signal; and performing automatic exposure control for the short-exposure image signal using the luminance information.

An exposure control method according to an embodiment of the present invention is performed in an exposure setting mode in which exposure control is performed in accordance with a user's setting and is performed by an image capturing apparatus for obtaining a long-exposure image signal by exposure for a relatively long period and a short-exposure image signal by exposure for a relatively short period, generating a combined image signal with a dynamic range that is relatively wider than that of at least any one of the long-exposure image signal and the short-exposure image signal by combining the long-exposure image signal and the short-exposure image signal, and outputting the generated combined image signal. The exposure control method includes the steps of: obtaining luminance information of the combined image signal; detecting occurrence of overexposure in the combined image signal using the luminance information; setting a short-exposure period on the basis of a detection result of the occurrence of the overexposure; and performing exposure control for the short-exposure image signal using the short-exposure period.

A program according to an embodiment of the present invention is a program causing a computer to perform the exposure control method.

In an embodiment of the present invention, when image capturing is performed in the exposure setting mode, a long-exposure image signal and a short-exposure image signal, which are obtained in a unit period such as one field period, are combined into a combined image signal. Subsequently, for example, a luminance histogram (distribution of luminance levels) of the combined image signal is generated as luminance information of the combined image signal, and is then analyzed. On the basis of the analysis result, automatic exposure control is performed for the short-exposure image signal. That is, in the exposure setting mode, image capturing is performed using a wide dynamic range image capturing function. Subsequently, the luminance histogram (distribution of luminance levels) of a combined image obtained by the image capturing is generated and is then analyzed. Using the analysis result, the short-exposure period (short-exposure electronic shutter) is changed so as to prevent occurrence of overexposure.

According to an embodiment of the present invention, when image capturing is performed in the exposure setting mode, a long-exposure image signal and a short-exposure image signal are combined into a combined image signal. Subsequently, for example, a luminance histogram (distribution of luminance levels) of the combined image signal is generated as luminance information of the combined image signal, and is then analyzed. On the basis of the analysis result, automatic exposure control is performed for the short-exposure image signal. Consequently, overexposure can be prevented from occurring at a portion other than a main subject. The quality of a captured image can therefore be improved.

The above-described exposure control is performed using the combined image signal obtained by combining the long-exposure image signal and the short-exposure image signal. Accordingly, before the signal combination, the long-exposure image signal and the short-exposure image signal may be variously processed. Accordingly, although processing performed before the combination of the long-exposure image signal and the short-exposure image signal varies from wide dynamic range camera system to wide dynamic range camera system, an embodiment of the present invention can be applied to many wide dynamic range camera systems.

DESCRIPTION OF THE PREFERRED EMBODIMENTS

Embodiments of the present invention will be described below in the following order: 1. Summary of Wide Dynamic Range Camera; 2. Configuration of Image Capturing Apparatus; 3. Entire Operation of Image Capturing Apparatus; 4. Overexposure Correction Process; 5. Another Example of Overexposure Correction Process; and 6. Exemplary Modification and Program.

1. Summary of Wide Dynamic Range Camera

An image capturing apparatus (FIG. 1) according to an embodiment of the present invention is a wide dynamic range camera suitable for, for example, use as a surveillance camera. However, the dynamic range camera can be used as a digital still camera or a digital video camera targeted for general use. First, the description of a wide dynamic range camera will be made.

It is difficult for commonly used image capturing apparatuses to handle a wide dynamic range between an extremely dark portion and an extremely bright portion in a scene. For example, a case is considered in which an image capturing apparatus installed in a room with a view performs image capturing during the daytime on a sunny day. At that time, if exposure is performed after a subject in the room has been set as an exposure reference point, the outdoor portion outside the room is overexposed. Conversely, if exposure is performed after the outdoor portion has been set as an exposure reference point, the subject in the room is underexposed. That is, if there is a large difference between luminance levels in a scene, it is difficult to obtain a captured image corresponding to the luminance dynamic range.

Figure 2:
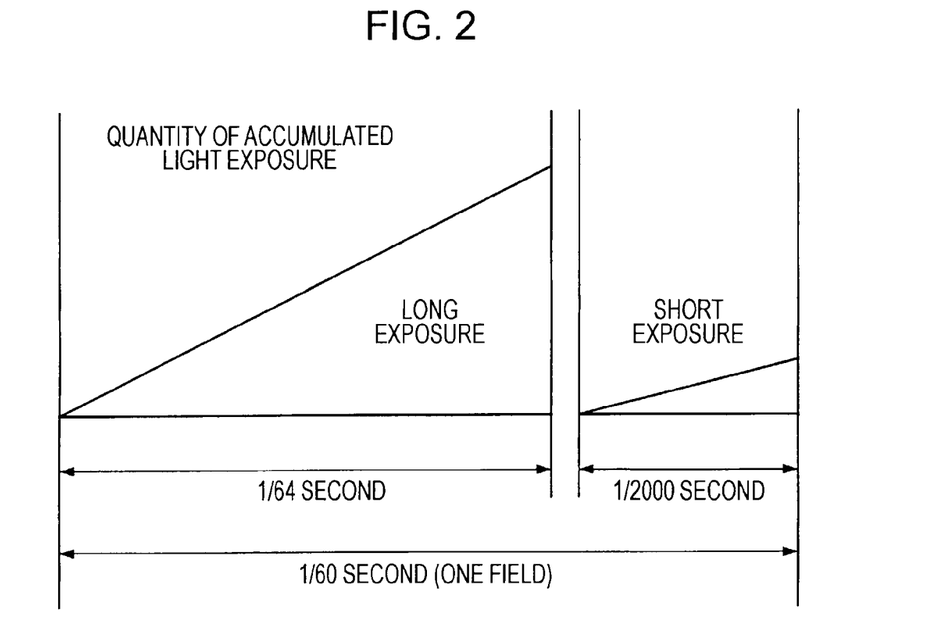
FIG. 2 is a diagram describing long exposure according to an embodiment of the present invention and short exposure according to an embodiment of the present invention.

On the other hand, a wide dynamic range camera according to an embodiment of the present invention obtains a captured image including no overexposed or underexposed portion by changing an electronic shutter speed each time an image is captured so as to change an exposure period and combining images that have been obtained with different exposure periods. FIG. 2 illustrates the relationship between an exposure period in one field and the quantity of accumulated light exposure (the amount of electrical charge) in an image pickup device unit such as a CCD or CMOS (Complementary Metal Oxide Semiconductor) sensor array. In this embodiment, for example, a long exposure of $1/64$ second and a short exposure of $1/2000$ second are performed in one field period of $1/60$ second. The exposure periods of the long exposure and the short exposure may be changed. By performing the long exposure and the short exposure, a long-exposure image signal and a short-exposure image signal are obtained in one field period. The obtained image signals are combined.

Figure 3:
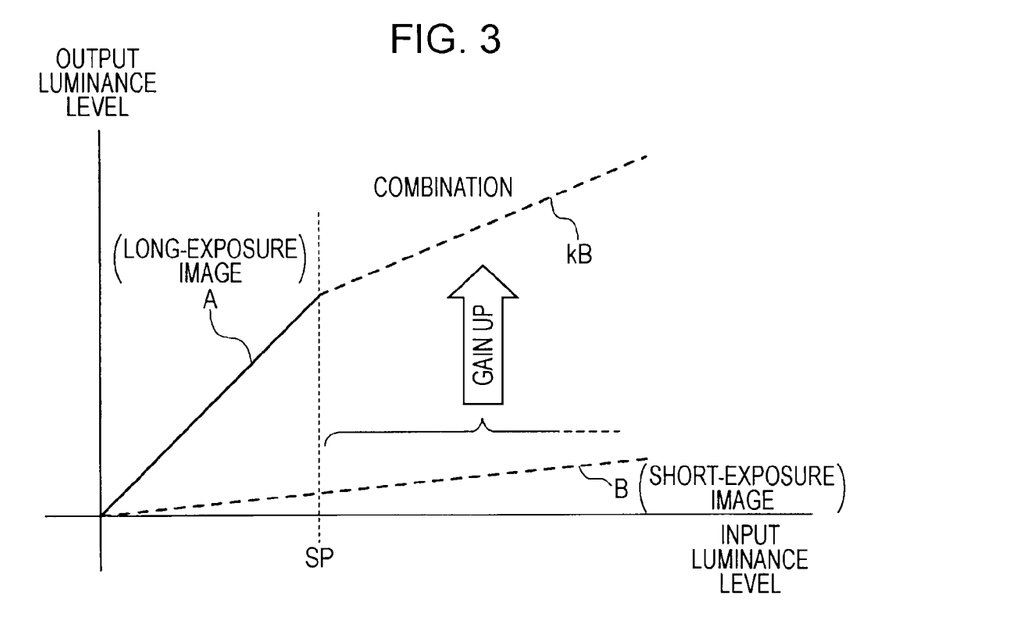
FIG. 3 is a diagram describing signal combination processing according to an embodiment of the present invention.

FIG. 3 illustrates an input-output luminance characteristic A of a long-exposure image signal and an input-output luminance characteristic B of a short-exposure image signal. In signal combination processing, for example, a predetermined luminance value is set as a switching point SP. A pixel having a luminance level lower than the switching point SP uses the long-exposure image signal as a pixel signal. On the other hand, a pixel having a luminance level higher than the switching point SP uses the short-exposure image signal as a pixel signal. At that time, the exposure ratio of the long-exposure image signal to the short-exposure image signal is multiplied by the short-exposure image signal, whereby the level adjustment of these image signals is performed. It is assumed that the exposure ratio of the long-exposure image signal to the short-exposure image signal is 10:1. In this case, the exposure level of the short-exposure image signal is one-tenth that of the long-exposure image signal. However, existing light quantity is at least ten times the luminance level of the short-exposure image signal. Accordingly, the short-exposure image signal is multiplied by the value of 10 for level adjustment. Thus, by performing a gain multiplication of the short-exposure image signal, a characteristic kB the level of which is adjusted to that of the characteristic of the long-exposure image signal can be obtained as illustrated in the drawing. Consequently, a combined image having a characteristic A-kB is generated. That is, the long-exposure image signal is used in a relatively dark portion in a scene so as to prevent the occurrence of underexposure and the short-exposure image signal is used in a relatively bright portion so as to prevent the occurrence of overexposure. Consequently, a combined image including no overexposed portion and no underexposed portion is generated.

As a method of capturing an image of a subject having a wide dynamic range between a bright portion and a dark portion, there are various methods other than the above-described method of combining a bright image and a dark image which have been obtained by changing an exposure period. For example, these various methods include a method of changing sensitivity on a pixel-by-pixel basis, extracting only signals having the same exposure condition, reproducing an image using the extracted signals, and combining one or more images having different exposure conditions, and a method of separating incident light using a prism, and combining a signal output from an image pickup device attached to a filter having a light reduction function such as an ND filter (Neutral Density filter: light quantity control filter) for reducing the quantities of light of all wavelengths transmitted therethrough, that is, reducing the quantities of incident light equally and a signal output from an image pickup device with no ND filter.

Wide dynamic range cameras using one of the above-described methods have a dynamic range wider than that of commonly used video cameras, and can capture an image of a subject having a wide dynamic range. A subject having a wide dynamic range means that the output image of the subject includes a bright portion and a dark portion. Accordingly, such wide dynamic range cameras are suitable for image capturing performed in a room where strong light enters from outside or a place where there is a large difference between luminance levels. For example, such wide dynamic range cameras are suitable for use as cameras required to perform image capturing in a place where a dynamic range significantly differs in accordance with an image capturing time in the daytime or nighttime, for example, at the entrance of a bank or on a road where traffic conditions are monitored. In particular, they are suitable for use as surveillance cameras.

2. Configuration of Image Capturing Apparatus

Figure 1:
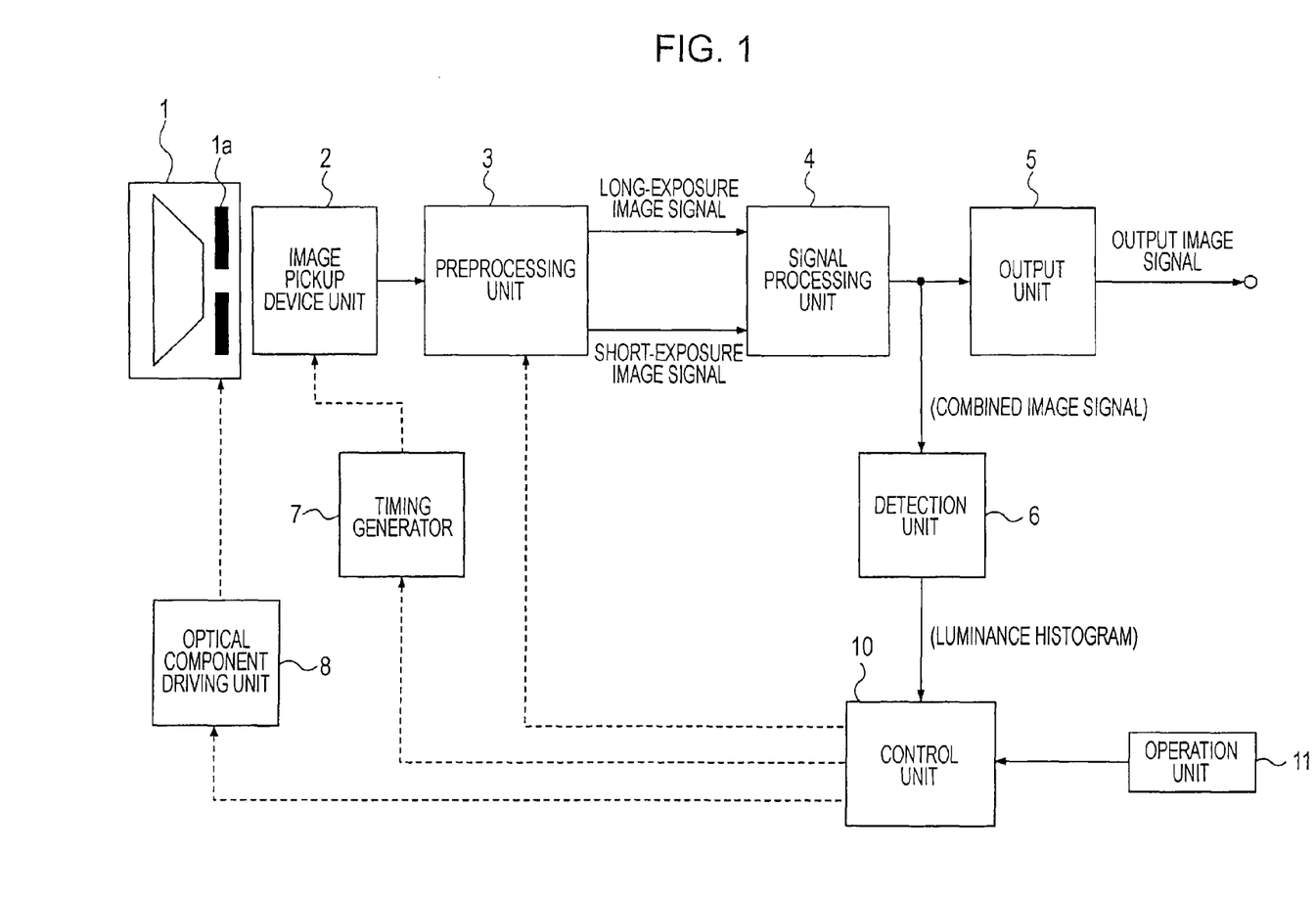
FIG. 1 is a block diagram of an image capturing apparatus according to an embodiment of the present invention.

FIG. 1 illustrates the configuration of an image capturing apparatus according to an embodiment of the present invention. An image capturing apparatus according to an embodiment of the present invention includes an image capturing optical system 1, an image pickup device unit 2, a preprocessing unit 3, a signal processing unit 4, an output unit 5, a detection unit 6, a timing generator 7, an optical component driving unit 8, a control unit 10, and an operation unit 11.

The image capturing optical system 1 includes optical components such as a lens, an optical filter for removing an unnecessary wavelength component, and an aperture 1a. Light is transmitted from a subject to the image pickup device unit 2 via each optical component included in the image capturing optical system 1. The image pickup device unit 2 is a solid-state image pickup device unit such as a CCD sensor array or a CMOS sensor array. The image pickup device unit 2 photoelectrically converts the light transmitted via the image capturing optical system 1 into an electric signal, and outputs the electric signal so as to generate a captured image.

In this embodiment, the image pickup device unit 2 performs the above-described long exposure and the above-described short exposure in one field period, and outputs time-shared electric signals as the long-exposure image signal and the short-exposure image signal. The image pickup device unit 2 may not be a solid-state image pickup device unit, and may be a nonsolid-state image pickup device unit such as an image pickup tube. A nonsolid-state image pickup device can also perform the long exposure and the short exposure by using a mechanical shutter or a liquid crystal shutter. The preprocessing unit 3 is a so-called Analog Front End, and performs CDS (Correlated Double Sampling) processing, gain processing using a programmable gain amplifier (PGA), and A/D conversion processing upon the electric signals used for generation of a captured image, and supplies the processed long-exposure image signal and the processed short-exposure image signal to the signal processing unit 4.

The signal processing unit 4 performs the signal combination processing described with reference to FIG. 3 upon the received long-exposure image signal and the received short-exposure image signal. That is, the signal processing unit 4 performs timing control and color balance correction upon the long-exposure image signal and the short-exposure image signal which have been supplied in accordance with a time-sharing method, performs gain processing so as to make the luminance level of the short-exposure image signal conform to that of the long-exposure image signal, and performs signal combination of these image signals. In addition, the signal processing unit 4 also performs gamma correction and white balance control upon the combined image signal, and outputs the processed combined image signal to the output unit 5 and the detection unit 6.

The output unit 5 performs processing so as to display an image on a display monitor using the combined image signal transmitted from the signal processing unit 4 or so as to transmit the combined image signal to an external apparatus. The detection unit 6 analyzes the luminance level of the combined image signal transmitted from the signal processing unit 4, generates luminance histogram information as information about the luminance level of the combined image signal, and supplies the luminance histogram information to the control unit 10.

The control unit 10 is a microcomputer (processor) including, for example, a CPU (Central Processing Unit), a ROM (Read-Only Memory), a RAM (Random Access Memory), and a flash memory, and controls the entire operation of the image capturing apparatus. In particular, this embodiment is characterized by an operation performed in the exposure setting mode. The control unit 10 performs exposure control in accordance with a user's operation in the exposure setting mode and performs automatic exposure control at the time of image capturing in the exposure setting mode so as to prevent occurrence of overexposure. The ROM included in the control unit 10 stores a program causing the control unit 10 to execute exposure control processing in the exposure setting mode that will be described later. The control unit 10 executes necessary computation and control processing using the luminance histogram information supplied from the detection unit 6.

The timing generator 7 generates an operating pulse for the image pickup device unit 2 that is, for example, a CCD. For example, the timing generator 7 generates various pulses such as a four-phase pulse for vertical transfer, a field shift pulse, a two-phase pulse for horizontal transfer, and a shutter pulse, and supplies them to the image pickup device unit 2. The timing generator 7 can drive the image pickup device unit 2 (electronic shutter function). By controlling the driving of the image pickup device unit 2, as illustrated in FIG. 2, the long-exposure image signal obtained by exposure for a relatively long period and the short-exposure image signal obtained by exposure for a relatively short period can be output. These exposure periods required for the generation of the long-exposure image signal and the short-exposure image signal may be changed. The optical component driving unit 8 drives the optical components included in the image capturing optical system 1. In this embodiment, the optical component driving unit 8 is a driving circuit for driving at least the aperture 1a and controlling incident light.

The operation unit 11 includes various handlers such as a key, a dial, and a touch pad with which a user's operation is performed. A user can perform a necessary input operation using the operation unit 11. In particular, in the case of the exposure setting mode according to this embodiment, a user can set the value of the aperture 1a, the long-exposure period for the image pickup device unit 2, and the gain value for the programmable gain amplifier (PGA) included in the preprocessing unit 3 using the operation unit 11. Although not illustrated, for example, a receiving unit for wirelessly receiving a radio wave or an infrared ray as an operation signal may be disposed so as to enable a user to perform an exposure setting operation using a remote controller. The remote controller may be connected to the receiving unit via a wired communication medium. At that time, an operation signal is input from the remote controller to the receiving unit via the wired communication medium.

3. Entire Operation of Image Capturing Apparatus

Figure 4:
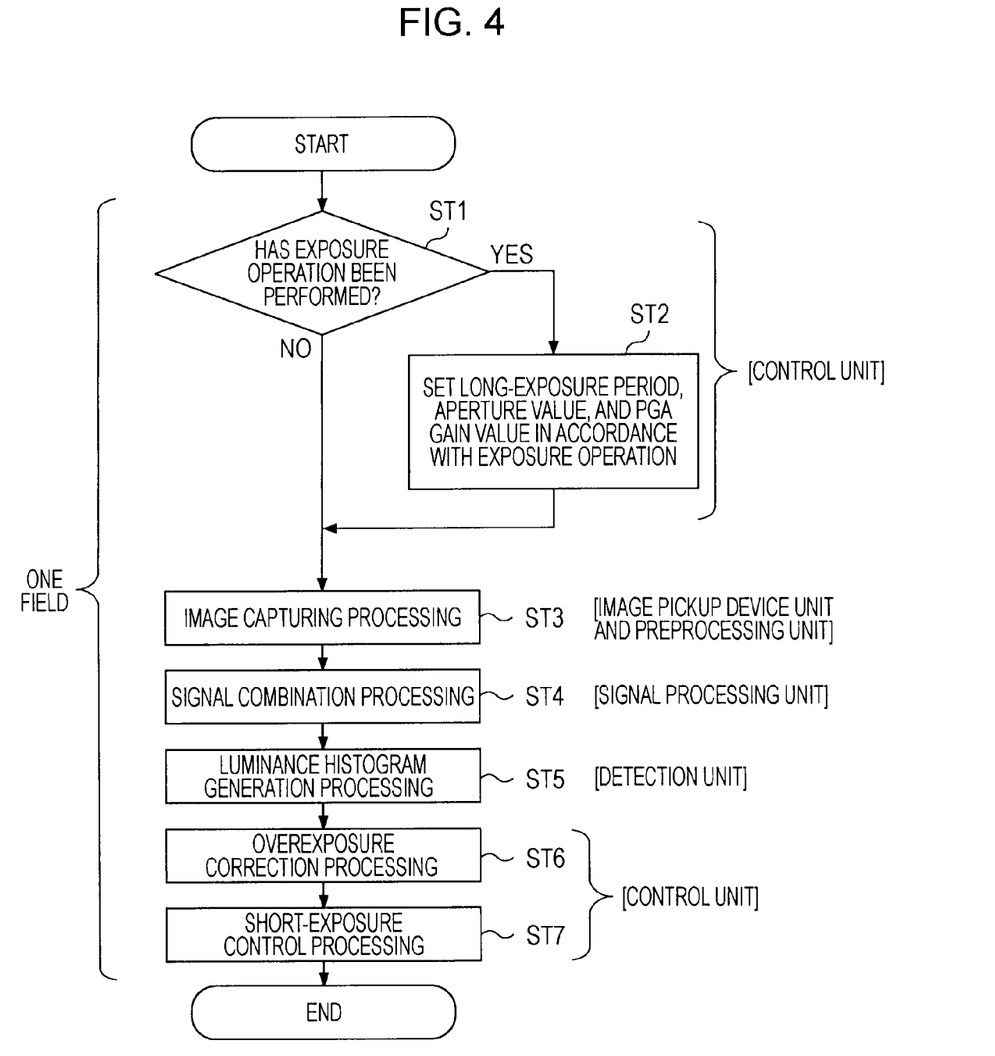
FIG. 4 is a flowchart illustrating a process performed by an image capturing apparatus according to an embodiment of the present invention.

In the following, exposure control operations performed in an image capturing apparatus according to an embodiment of the present invention will be described. First, the entire image capturing process performed when the exposure setting mode is set in the image capturing apparatus will be described. The image capturing process includes the exposure control operations. FIG. 4 illustrates a process performed in one field period. During image capturing, the process illustrated in FIG. 4 is repeated.

Steps ST1 and ST2: Exposure Control Processing Performed in Accordance with User's Setting In the exposure setting mode, for example, a user appropriately performs an exposure setting operation for a main subject using the operation unit 11. Accordingly, during image capturing, in step ST1, the control unit 10 monitors whether the exposure setting operation has been performed by a user. If a user performs the exposure setting operation using the operation unit 11, the control unit 10 performs exposure control in step ST2. That is, the control unit 10 performs a control operation on the basis of the setting values of the aperture 1a, the long-exposure period, and the PGA gain which have been input by the user. In this case, the control unit 10 causes the optical component driving unit 8 to drive the aperture 1a, transmits information about the long-exposure period to the timing generator 7, and transmits information about the gain of the PGA to the preprocessing unit 3. Thus, a user performs the exposure setting operation in accordance with the condition of a subject the image of which is desired to be captured, whereby the value of the aperture 1a, the long-exposure period, and the PGA gain value are set to user's settings. For example, the long-exposure period of $1/120$ second, the aperture value of F8, and the gain value of 6 dB are set. All of these three parameters may be controlled, or one or two of them may be controlled. A method enabling a user to separately specify these three parameters may be employed. Alternatively, a user may perform a setting operation for the increase in the quantity of light exposure or the decrease in the quantity of light exposure. Subsequently, the control unit 10 may calculate setting values of the aperture 1$a$, the long-exposure period, and the PGA gain in accordance with the user's setting operation, thereby controlling these three parameters.

Step ST3: Image Capturing Processing

The timing generator 7 can set two different electronic shutter speeds, and causes the image pickup device unit 2 to perform the long exposure and the short exposure, which have been described with reference to FIG. 2, in one field period. Consequently, two image capturing signals having different quantities of light exposure are obtained. As described previously, the long-exposure image signal and the short-exposure image signal are processed by the preprocessing unit 3, and are then supplied to the signal processing unit 4. The long-exposure period is set in accordance with a user's exposure setting operation. On the other hand, the short-exposure period is automatically controlled in step ST7 that will be described later.

Step ST4: Signal Combination Processing

The signal processing unit 4 combines, using the method described with reference to FIG. 3, the long-exposure image signal and the short-exposure image signal which have been digitalized by the preprocessing unit 3 so as to generate a combined image signal with a wider dynamic range. This combined image signal is output from the output unit 5 so as to be displayed on, for example, a display monitor.

Step ST5: Luminance Histogram Generation Processing

Figure 5:
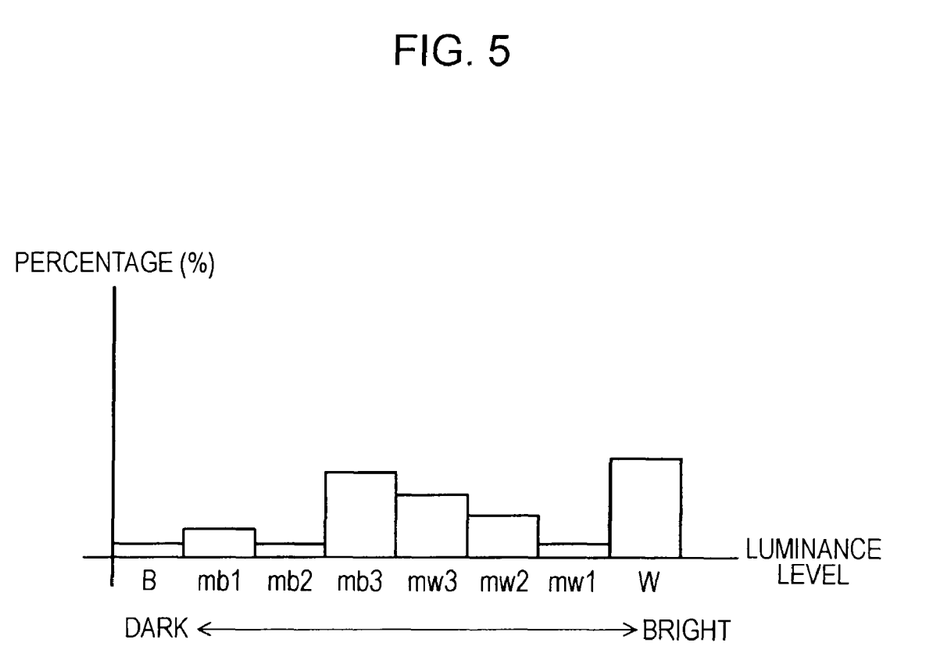
FIG. 5 is a diagram describing a luminance histogram according to an embodiment of the present invention.

The combined image signal is also supplied to the detection unit 6. The detection unit 6 generates a luminance histogram of the combined image signal, and transmits it to the control unit 10 on a field-by-field basis. FIG. 5 illustrates an example of the luminance histogram. In this example, luminance levels are classified into eight luminance levels, a black level (B), levels (mb1), (mb2), (mb3), (mw3), (mw2), and (mw1), and a white level (W) This example illustrates the percentages (%) of the eight luminance levels in a one-field image.

Step ST6: Overexposure Correction Processing

The control unit 10 obtains the luminance histogram from the detection unit 6, detects the occurrence of overexposure in the combined image signal using the luminance histogram, and determines the short-exposure period so as to eliminate an overexposed portion on the basis of the detection result. The detection of the occurrence of the overexposure is performed by checking the percentage of the white level (W) in the luminance histogram. The short-exposure period is set so that the percentage of the while level (W) in the luminance histogram becomes a predetermined percentage.

Step ST7: Short-Exposure Control Processing

The control unit 10 performs automatic exposure control processing using the short-exposure period that has been determined in the overexposure correction processing. That is, the control unit 10 transmits information about the short-exposure period, which has been set in the overexposure correction processing, to the timing generator 7 so as to cause the timing generator 7 to change the short-exposure period for the image pickup device unit 2. Consequently, the quantity of light exposure required for the short-exposure image signal can be obtained.

4. Overexposure Correction Process

The overexposure correction processing performed by the control unit 10 in step ST6 illustrated in FIG. 4 will be described in detail with reference to FIG. 6. In step F100, the control unit 10 obtains a luminance histogram output from the detection unit 6. Subsequently, in step F101, the control unit 10 determines whether the percentage of the white level (W) in the luminance histogram is equal to or greater than 10%. If the percentage of the white level (W) is equal to or greater than 10%, the control unit 10 determines that overexposure occurs in a combined image signal. Subsequently, the process proceeds to step F103 in which the control unit 10 updates a short-exposure period Tt with a value obtained by subtracting a fixed positive value Ct from the current short-exposure period Tt so as to reduce the quantity of light exposure. On the other hand, if the percentage of the white level (W) is lower than 10%, in step F102, the control unit 10 determines whether the percentage of the white level (W) is equal to or lower than 5%. If the percentage of the white level (W) is equal to or lower than 5%, the process proceeds to step F104 in which the control unit 10 updates the short-exposure period Tt with a value obtained by adding the fixed value Ct to the current short-exposure period Tt so as to increase the quantity of light exposure. On the other hand, if it is determined in step F102 that the percentage of the white level (W) is not equal to or lower than 5%, that is, is within the range of 5% to 10%, it is determined that an appropriate quantity of light exposure is set. Subsequently, the process proceeds to step F105 in which the current short-exposure period Tt is maintained.

Thus, the short-exposure period Tt is determined. As described previously, using the short-exposure period Tt, the exposure control processing is performed in step ST7 illustrated in FIG. 4. The process illustrated in FIG. 4 which includes the overexposure correction processing (step ST6) illustrated in FIG. 6 is repeated in each field period. Consequently, an exposure condition capable of preventing the occurrence of overexposure in a combined image signal is set. In steps F103 and F104 illustrated in FIG. 6, a new short-exposure period is computed using a current short-exposure period and a fixed value and is then set. Consequently, the luminance level of a combined image signal is controlled while the quantity of light exposure is gradually changed.

By performing the above-described process in an image capturing apparatus according to an embodiment of the present invention, the quality of an image captured in the exposure setting mode can be improved. As described previously, if the exposure setting mode is selected in a camera that does not have a wide dynamic range image capturing function, a user controls the exposure period, the aperture value, and the gain value in accordance with the luminance level of a subject the image of which is desired to be captured (a main subject) so that an appropriate exposure level can be obtained. As a result, even if a luminance level of the background of the main subject is changed, the luminance level of the main subject can be maintained. On the other hand, however, overexposure may occur at a portion with a high luminance level on the background since exposure control is not performed in accordance with the luminance level of the background. In an image capturing apparatus according to an embodiment of the present invention, image capturing with a wide dynamic range is performed when the exposure setting mode is selected. The luminance histogram (distribution of luminance levels) of a combined image signal obtained in the image capturing with a wide dynamic range is analyzed. A short-exposure period is obtained on the basis of the analysis result. Feedback control is performed using information about the obtained short-exposure period. Consequently, the occurrence of overexposure can be prevented. Thus, a difficulty in the exposure setting mode can be solved.

Figure 7:
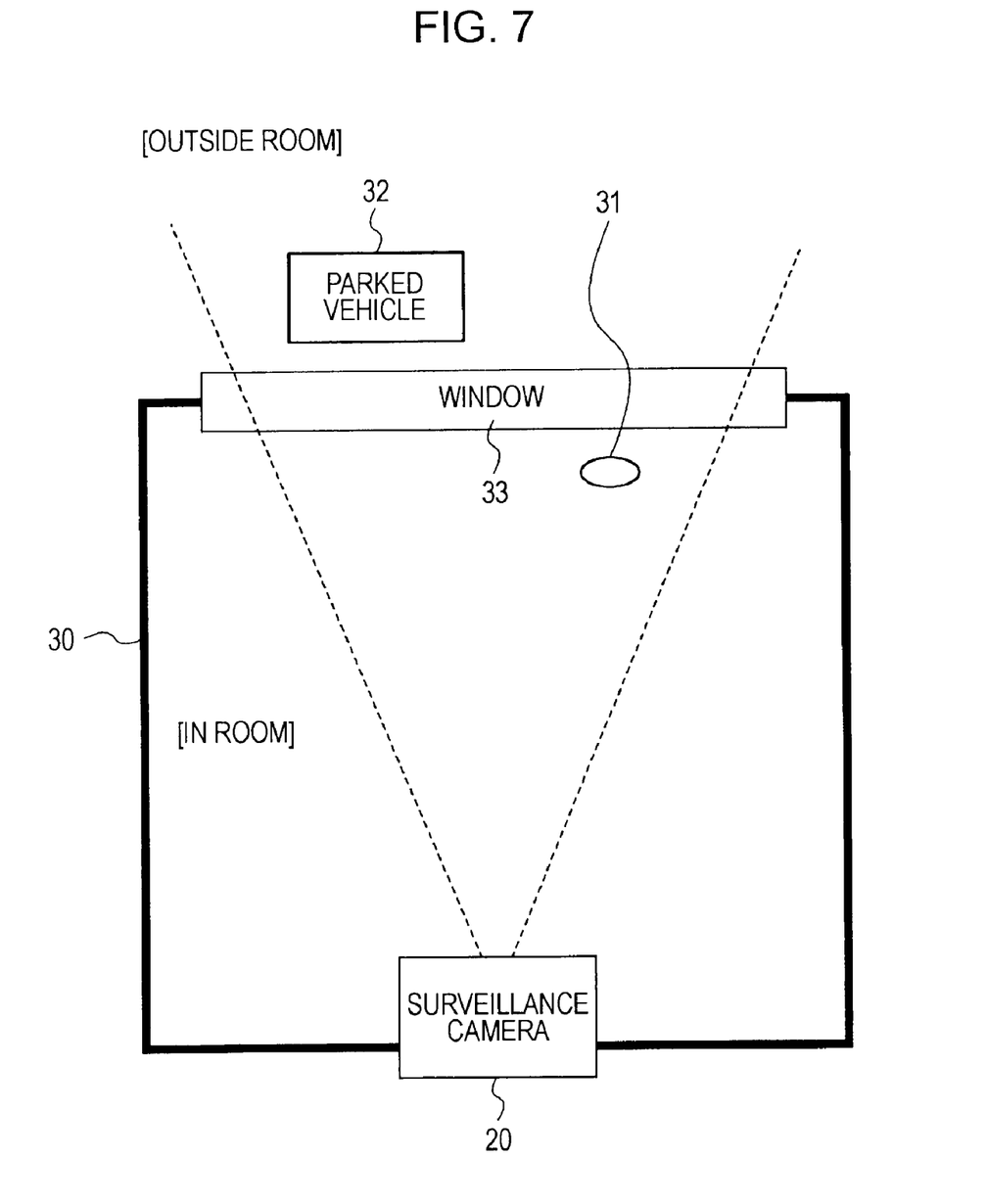
FIG. 7 is a diagram describing the location of a surveillance camera according to an embodiment of the present invention and a subject.

The improvement in image quality will be described with reference to an exemplary case in which a surveillance camera 20 illustrated in FIG. 7 is used as an image capturing apparatus according to an embodiment of the present invention. FIG. 7 illustrates a situation in which the surveillance camera 20 is located in a room in a building 30 that is, for example, a bank. The surveillance camera 20 captures an indoor image, for example, an image of a person 31 in the room. In addition, in this situation, it is required to monitor not only the person 31 in the room but also a parked vehicle 32 outside the room. Accordingly, the surveillance camera 20 is located so that it can also capture an outdoor image through a window 33.

Thus, since it is required to monitor not only the person 31 in the room but also the parked vehicle 32 outside the room, the automatic exposure mode is usually set in the surveillance camera 20 so that image capturing with a wide dynamic range is performed. By performing image capturing with a wide dynamic range in the above-described situation in which there is a large difference between an indoor illumination level of, for example, 800 lux and an outdoor illumination level of, for example, 10,000 lux, the occurrence of an underexposed portion in an indoor image and the occurrence of an overexposed portion in an outdoor image can be prevented. The detailed description of processing performed in the automatic exposure mode will be omitted. In the case of the automatic exposure mode, however, the control unit 10 calculates an appropriate amount of exposure correction on the basis of the luminance histogram and a luminance integrated value which have been obtained from the detection unit 6, and automatically controls the value of the aperture 1a, the long-exposure period, and a PGA gain value on the basis of the calculation result.

Figure 8A:
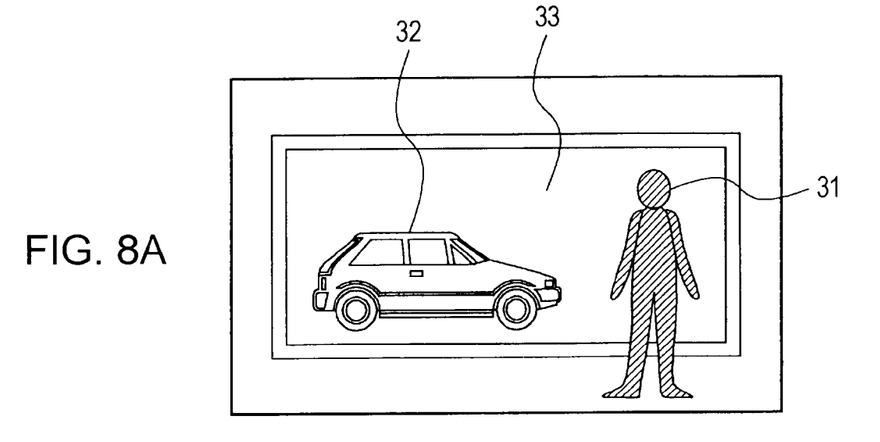
FIGS. 8A, 8B, and 8C are diagrams describing the improvement in image quality which is achieved by a surveillance camera according to an embodiment of the present invention.

Here, it is assumed that a user (operator) of the surveillance camera 20 sees in the room the suspicious person 31 whose face is slightly dark as illustrated in FIG. 8A. At that time, if the image capturing with a wide dynamic range is performed in the automatic exposure mode, an image having no underexposed portions and no overexposed portions can be captured. However, it may be difficult to check the face of the person 31 under the influence of the ambient luminance level. Accordingly, in order to record the clear image of the suspicious person 31 using a recorder, the user changes the automatic exposure mode to the exposure setting mode. Subsequently, the user performs an exposure control operation using the operation unit 11 while checking a captured image. In accordance with the user's operation, the control unit 10 controls the value of the aperture 1a, the long-exposure period, and the PGA gain value. Thus, a user performs an exposure setting operation while checking the image of the face of the person 31 as the image of a main subject. Consequently, an exposure condition allowing the user to most easily check the person 31 is set.

Figure 8B:
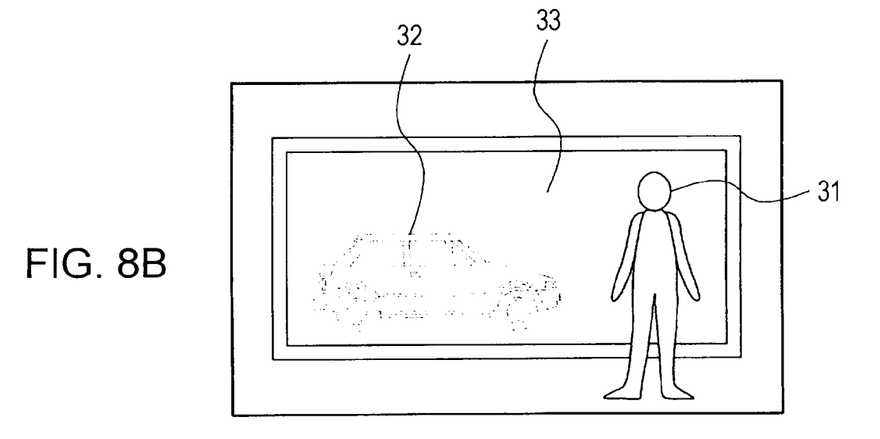

Here, an image captured in the above-described situation using a camera that is not a camera according to an embodiment of the present invention is illustrated in FIG. 8B. If exposure control is performed after the automatic exposure mode has been changed to the exposure setting mode in a camera that cannot perform image capturing with a dynamic range, a user of the camera can check the clear image of the face of the person 31, but cannot check the type of the parked vehicle 32. The reason for this is that there is a large difference between an indoor luminance level and an outdoor luminance level and an outdoor portion is saturated (overexposed). Even in the case of a camera capable of performing image capturing with a dynamic range, if the short-exposure period is not changed in accordance with the change in luminance level unlike this embodiment (in the case of a camera having a fixed short-exposure period), the camera may not check the type of the parked vehicle due to the saturation (overexposure) as illustrated in FIG. 8B when the outdoor illumination level is changed in accordance with weather or time and becomes higher than expected.

Figure 8C:
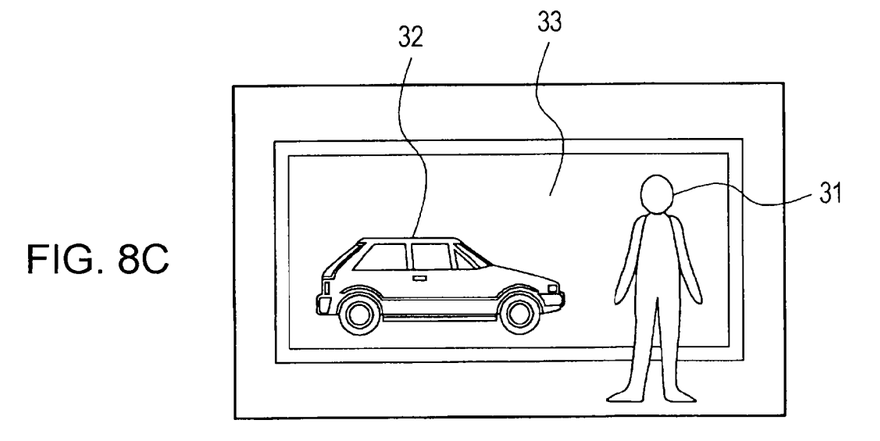

On the other hand, if the surveillance camera 20 is an image capturing apparatus according to an embodiment of the present invention, the short-exposure period is automatically controlled in accordance with the change in luminance level after exposure control has been appropriately performed for the person 31 in the exposure setting mode. Accordingly, the occurrence of overexposure illustrated in FIG. 8B can be prevented, and an image illustrated in FIG. 8C can be captured regardless of the difference between the indoor illumination level and the outdoor illumination level and the change in the outdoor illumination level. That is, it is possible to obtain an image allowing a user to check the clear image of the suspicious person 31 in the room and the type of the parked vehicle 32 outside the room. Consequently, the exposure setting mode can be effectively used.

As is apparent from the above-described example, in this embodiment, it is determined at the time of image capturing in the exposure setting mode whether an overexposed portion is included in a combined image using the luminance histogram of the combined image. If it is determined that the overexposed portion is included in the combined image, automatic exposure control is performed so as to eliminate the overexposed portion. Consequently, the quality of a combined image can be improved. That is, the quality of an image output to a display monitor is improved. A user can therefore feel the improvement of the quality of the image displayed on the display monitor. The important factor in choosing a wide dynamic range camera is not only the numerical value of a dynamic range but also the quality of a final picture. Accordingly, the ability to optimize a final image is a big advantage for wide dynamic range cameras.

Furthermore, an exposure control method according to an embodiment of the present invention is less affected by a signal combination method performed by the signal processing unit 4 for generating a combined image which is included in a wide dynamic range camera. Accordingly, an exposure control method according to an embodiment of the present invention can be applied to various types of signal processing units. Still furthermore, an exposure control method according to an embodiment of the present invention is also less affected by a signal combination time (images with two different quantities of light exposure are obtained every one field or two fields). Accordingly, an exposure control method according to an embodiment of the present invention can be applied to various types of wide dynamic range camera systems. Still furthermore, the detection unit 6 processes a combined image signal. That is, only a single detection unit is required, and a detection unit is not required for each of the long-exposure image signal and the short-exposure image signal. As a result, the simplification of the entire apparatus can be achieved.

5. Another Example of Overexposure Correction Process

Figure 6:
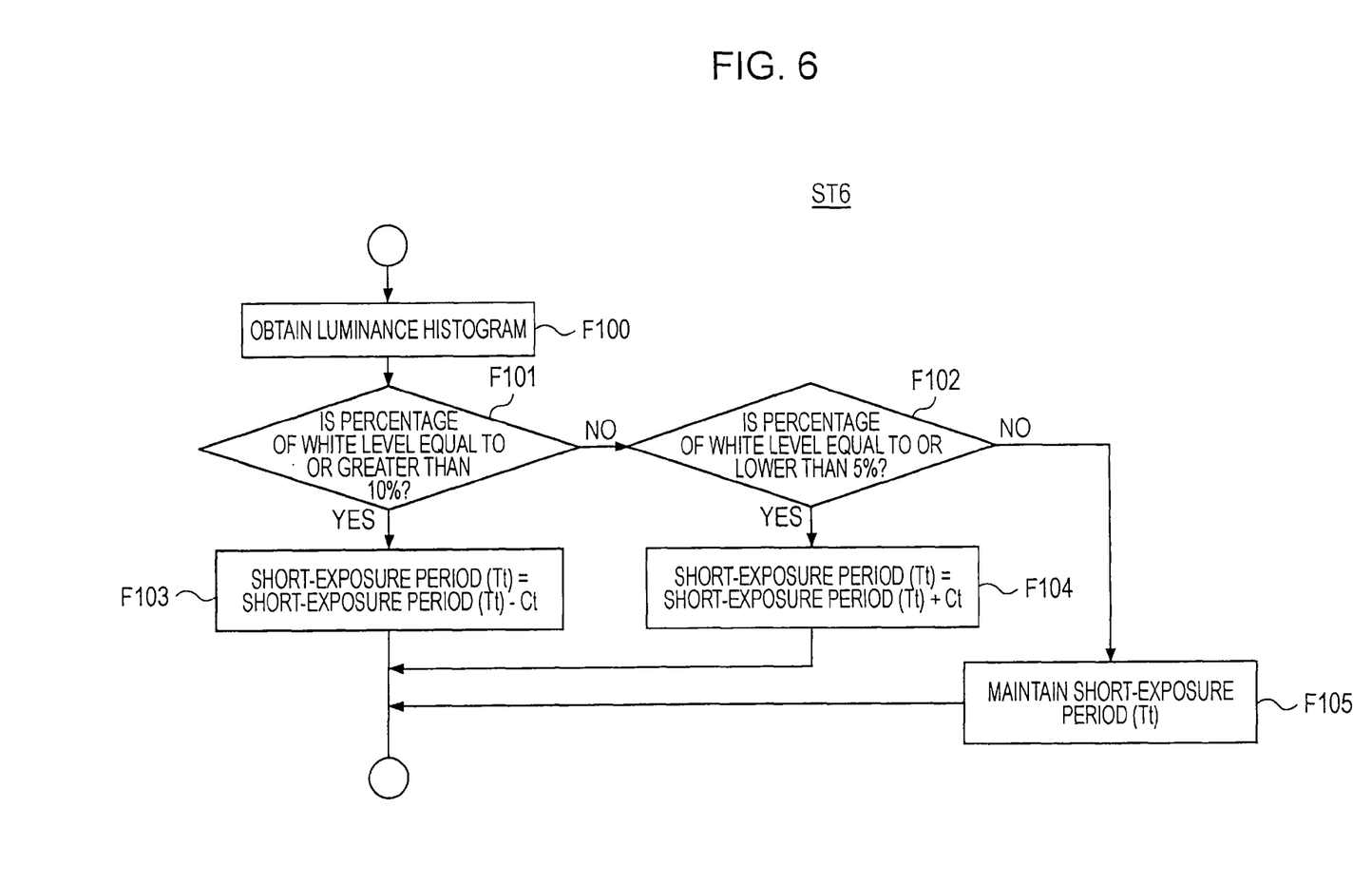
FIG. 6 is a flowchart illustrating an overexposure correction process according to an embodiment of the present invention.

As an example of the overexposure correction processing in step ST6 illustrated in FIG. 4, the process illustrated in FIG. 6 has been described. Another example of the underexposure correction process will be described with reference to FIGS. 9 and 10.

Figure 9:
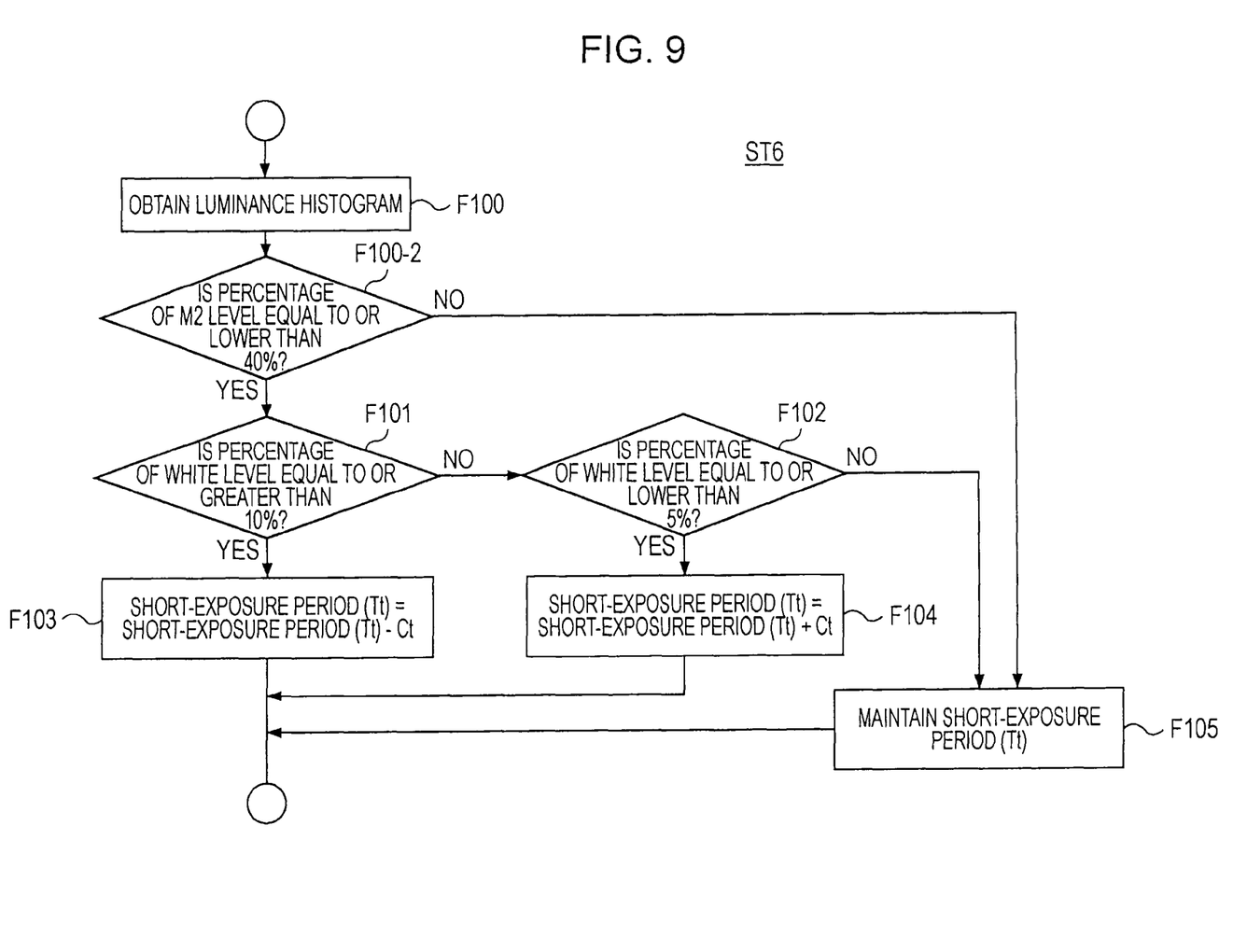
FIG. 9 is a flowchart illustrating another example of an overexposure correction process according to an embodiment of the present invention.

In an overexposure correction process illustrated in FIG. 9, the intermediate luminance level of the luminance histogram is also used for the setting of the short-exposure period Tt.

Referring to FIG. 9, the control unit 10 obtains the luminance histogram in step F100 and determines whether the percentage of an M2 level is equal to or lower than 40% in the luminance histogram in step F100-2. The M2 level corresponds to the mw1, mw2, and mw3 levels (that is, the higher luminance side of the intermediate luminance level) in the luminance histogram illustrated in FIG. 5. That is, it is determined whether the total of the percentages of the mw1, mw2, and mw3 levels exceeds 40%. If the overexposure correction is performed when the percentage of the M2 level, which is the intermediate luminance level, is high, there is a possibility that the intermediate luminance level is decreased. Accordingly, in this case, no correction is performed. That is, if the percentage of the M2 level exceeds 40%, the process proceeds to step F105 in which the short-exposure period Tt is maintained. On the other hand, if the percentage of the M2 level is equal to or lower than 40%, the process proceeds to step F101. The descriptions of steps F101, F102, F103, F104, and F105 have been made with reference to FIG. 6. By performing this process illustrated in FIG. 9, such a situation can be prevented in which the luminance level is decreased at a certain portion due to the overexposure correction.

Figure 10:
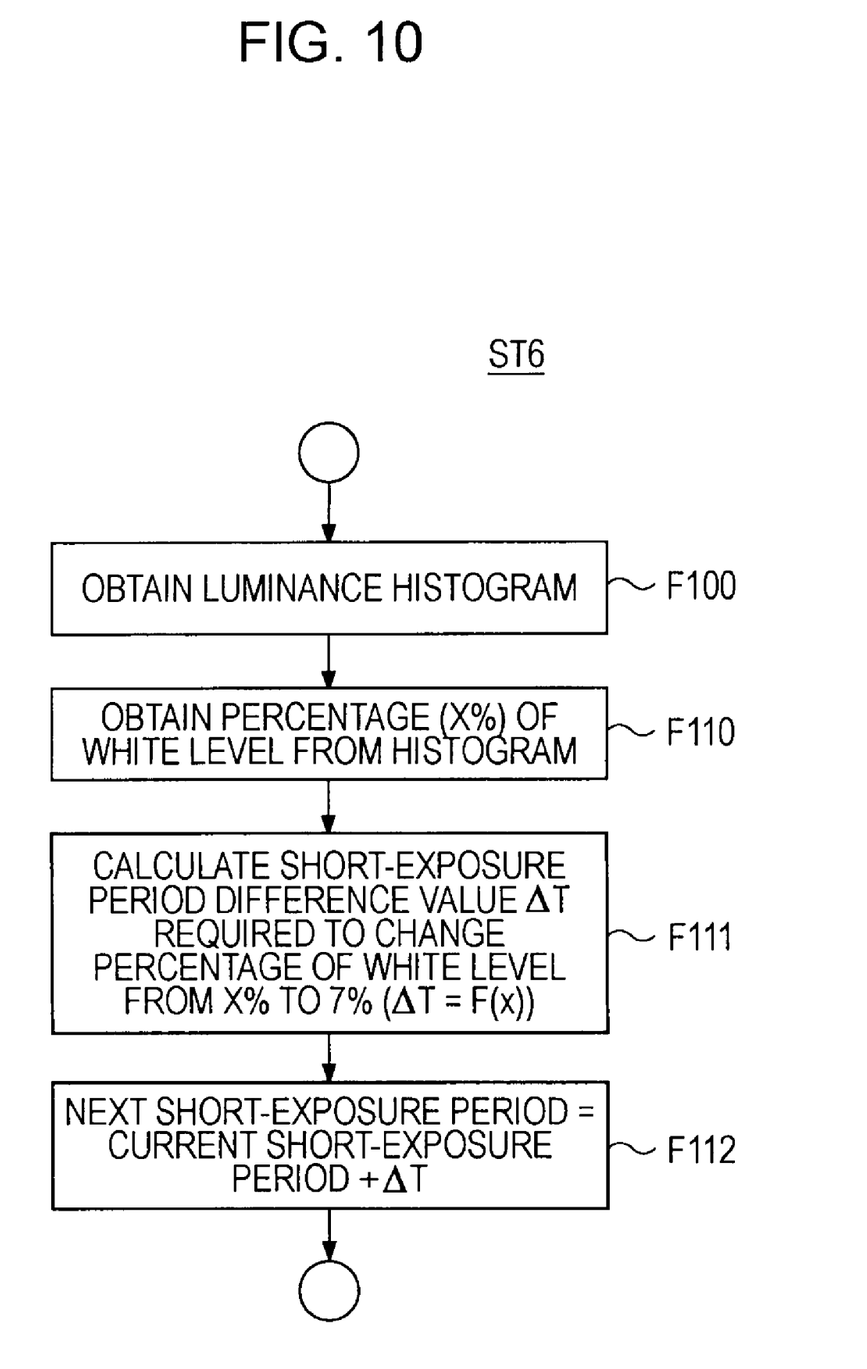
FIG. 10 is a flowchart illustrating still another example of an overexposure correction process according to an embodiment of the present invention.

FIG. 10 illustrates still another example of the overexposure correction process. In this example illustrated in FIG. 10, the control unit 10 obtains the luminance histogram in step F100, and checks the percentage (X %) of the white level (W) in the luminance histogram in step F110. In step F111, the control unit 10 calculates a short-exposure period difference value ΔT required to change the percentage of the white level (W) from X % to 7%. The short-exposure period difference value ΔT is a correction value for the short-exposure period Tt which is required to change the percentage of the white level (W) from X % to 7%, and is obtained from the percentage (X %) of the white level (W) using a function F. The percentage of 7% is an exemplary setting value of an appropriate percentage of the white level (W). Subsequently, in step F112, the control unit 10 updates the short-exposure period Tt with a value obtained by adding the short-exposure period difference value ΔT to the current short-exposure period Tt.

As described previously, by calculating the short-exposure period difference value ΔT as a difference value used for the convergence of the short-exposure period Tt and setting a new short-exposure period Tt obtained by performing computation using the current short-exposure period Tt and the short-exposure period difference value ΔT, the short-exposure period Tt that should be converged with a single processing operation can be obtained. Consequently, it is possible to speed up the overexposure correction.

6. Exemplary Modification and Program

Although embodiments of the present invention have been described, various exemplary modifications can be considered in the present invention. An embodiment of the present invention can be applied to a camera system for capturing a moving image. However, an embodiment of the present invention may be applied to a camera system for capturing a still image. Even in the case of image capturing of a still image in the exposure setting mode, the above-described exposure control (the control of the short-exposure period) may be performed in each field period during monitoring before an image capturing is performed. For example, if image capturing is performed using the noninterlaced scanning method, the above-described process performed in each field period may be considered as a process performed in each frame period. It is needless to say that a unit period for automatic control of the short-exposure period in the exposure setting mode may be variously considered as a field period, a frame period, a plurality of field periods, and a plurality of frame periods regardless of a scanning method used. For example, an exemplary case can be considered in which the luminance histogram generation processing (step ST5) illustrated in FIG. 4, the overexposure correction processing (step ST6) illustrated in FIG. 4, and the short-exposure control processing (step ST7) illustrated in FIG. 4 are performed every few frame periods.

A program according to an embodiment of the present invention is a program corresponding to the processing performed by the control unit 10. That is, a program according to an embodiment of the present invention is a program causing the control unit 10 that is a microcomputer (processor) to perform the overexposure correction processing in step ST6 illustrated in FIG. 4 (FIGS. 6, 9, and 10) and the short-exposure control processing in step ST7 illustrated in FIG. 4. Such a program can be recorded in advance in an HDD that is a recording medium included in, for example, a personal computer or an image capturing apparatus, or a ROM or flash memory included in a microcomputer having a CPU. Alternatively, the program may be temporarily or permanently stored (recorded) on a removal recording medium such as a flexible disk, a CD-ROM (Compact Disc-Read-Only Memory), an MO (Magneto-Optical) disk, a DVD (Digital Versatile Disc), a blue-ray disc, a magnetic disk, a semiconductor memory, or a memory card. Such a removable recording medium may be obtained as package software.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   an image capturing unit configured to generate a long-exposure image signal and a short-exposure image signal on the basis of light transmitted from a subject, the image capturing unit outputting the long-exposure image signal and the short-exposure image signal as image capturing signals, the long-exposure image signal being generated by exposure for a period longer than an exposure period for the short-exposure image signal;
   a signal processing unit configured to generate a combined image signal by combining the long-exposure image signal and the short-exposure image signal, a pixel in the combined image corresponding to the long-exposure signal when a luminance level of the pixel is lower than a predetermined luminance level, the pixel in the combined image corresponding to the short-exposure signal when the luminance level of the pixel is higher than the predetermined luminance value;
   a detection unit configured to generate luminance information of the combined image signal; and
   a control unit configured to perform automatic exposure control for the short-exposure image signal using the luminance information in an exposure setting mode in which exposure control is performed in accordance with a user setting, which sets the exposure period of the long-exposure signal.

2. The image capturing apparatus according to claim 1, wherein the detection unit generates a luminance histogram as the luminance information, and
   wherein the control unit detects occurrence of overexposure in the combined image signal using the luminance histogram, sets a short-exposure period on the basis of a detection result, and performs the automatic exposure control for the short-exposure image signal using the short-exposure period.

3. The image capturing apparatus according to claim 1, wherein the control unit sets a new short-exposure period by modifying a current short-exposure period by a fixed value.

4. The image capturing apparatus according to claim 1, wherein the control unit calculates a percentage of a desired luminance level region to a whole luminance level region in the combined image signal, and sets the new short-exposure period on the basis of a relationship between the percentage and a convergence target value.

5. The image capturing apparatus according to claim 2, wherein the detection unit classifies luminance levels into a black level, an intermediate luminance level, and a white level and generates information about a distribution of these luminance levels as the luminance histogram, and
wherein the control unit uses information about the intermediate luminance level for setting of the short-exposure period.

6. An image capturing method comprising:
generating a long-exposure image signal by exposure for a long period and a short-exposure image signal by exposure for a short period, the long period being longer than the short period, the long-exposure and short-exposure image signals being generated on the basis of light transmitted from a subject in an exposure setting mode in which exposure control is performed in accordance with a user setting, which sets the long period of the long-exposure image signal, the long-exposure image signal and the short-exposure image signal being output as image capturing signals;
generating a combined image signal by combining the long-exposure image signal and the short-exposure image signal, a pixel in the combined image corresponding to the long-exposure signal when a luminance level of the pixel is lower than a predetermined luminance level, the pixel in the combined image corresponding to the short-exposure signal when the luminance level of the pixel is higher than the predetermined luminance value;
generating luminance information of the combined image signal; and
performing automatic exposure control for the short-exposure image signal using the luminance information.

7. An exposure control method that is performed in an exposure setting mode in which exposure control is performed in accordance with a user setting, which sets a long period of a long-exposure image signal, and is performed by an image capturing apparatus for obtaining the long-exposure image signal by exposure for the long period and a short-exposure image signal by exposure for a short period, generating a combined image signal by combining the long-exposure image signal and the short-exposure image signal, a pixel in the combined image corresponding to the long-exposure signal when a luminance level of the pixel is lower than a predetermined luminance level, the pixel in the combined image corresponding to the short-exposure signal when the luminance level of the pixel is higher than the predetermined luminance value, and outputting the generated combined image signal, the exposure control method comprising:
obtaining luminance information of the combined image signal;
detecting occurrence of overexposure in the combined image signal using the luminance information;
setting a short-exposure period on the basis of a detection result of the occurrence of the overexposure; and
performing exposure control for the short-exposure image signal using the short-exposure period.

8. A non-transitory computer readable storage medium storing computer readable instructions thereon which, when executed by a computer, cause the computer to perform an exposure control method in an exposure setting mode in which exposure control is in accordance with a user setting, which sets a long period of a long-exposure image signal, and is performed by an image capturing apparatus for obtaining the long-exposure image signal by exposure for the long period and a short-exposure image signal by exposure for a short period shorter than the long period, generating a combined image signal by combining the long-exposure image signal and the short-exposure image signal, a pixel in the combined image corresponding to the long-exposure signal when a luminance level of the pixel is lower than a predetermined luminance level, the pixel in the combined image corresponding to the short-exposure signal when the luminance level of the pixel is higher than the predetermined luminance value, and outputting the generated combined image signal, the exposure control method comprising:
obtaining luminance information of the combined image signal;
detecting occurrence of overexposure in the combined image signal using the luminance information;
setting a short-exposure period on the basis of a detection result of the occurrence of the overexposure; and
performing exposure control for the short-exposure image signal using the short-exposure period.

* * * * *